(12) United States Patent
Khare et al.

(10) Patent No.: US 6,487,643 B1
(45) Date of Patent: Nov. 26, 2002

(54) METHOD AND APPARATUS FOR PREVENTING STARVATION IN A MULTI-NODE ARCHITECTURE

(75) Inventors: Manoj Khare, Saratoga, CA (US); Akhilesh Kumar, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 136 days.

(21) Appl. No.: 09/672,454

(22) Filed: Sep. 29, 2000

(51) Int. Cl.[7] .............................................. G06F 12/00
(52) U.S. Cl. ...................................... 711/150; 711/148
(58) Field of Search ................................ 711/141, 147, 711/148, 150; 710/105, 316

(56) References Cited

U.S. PATENT DOCUMENTS

| | | | |
|---|---|---|---|
| 5,485,579 A | 1/1996 | Hitz et al. .............. 395/200.12 |
| 5,495,419 A | 2/1996 | Rostoker et al. ............ 364/468 |
| 5,535,116 A | 7/1996 | Gupta et al. ................ 364/134 |
| 5,541,914 A | 7/1996 | Krishnamoorthy et al. ... 370/56 |
| 5,551,048 A | 8/1996 | Steely, Jr. .................. 395/800 |
| 5,557,533 A | 9/1996 | Koford et al. ............... 364/491 |
| 5,581,729 A | 12/1996 | Nishtala et al. ............. 395/470 |
| 5,588,131 A | 12/1996 | Borrill ........................ 395/473 |
| 5,588,132 A | 12/1996 | Cardoza ..................... 395/475 |
| 5,588,152 A | 12/1996 | Dapp et al. ................. 395/800 |
| 5,590,292 A | 12/1996 | Wooten et al. .............. 395/825 |
| 5,590,345 A | 12/1996 | Barker et al. ............... 395/800 |
| 5,594,918 A | 1/1997 | Knowles et al. ............ 395/800 |
| 5,603,005 A | 2/1997 | Bauman et al. ............. 395/451 |
| 5,613,136 A | 3/1997 | Casavant et al. ............ 395/800 |
| 5,617,537 A | 4/1997 | Yamada et al. ......... 395/200.01 |
| 5,625,836 A | 4/1997 | Barker et al. ................ 395/800 |
| 5,634,004 A | 5/1997 | Gopinath et al. ....... 395/200.02 |
| 5,634,068 A | 5/1997 | Nishtala et al. ............. 395/800 |
| 5,636,125 A | 6/1997 | Rostoker et al. ......... 364/468.28 |
| 5,644,753 A | 7/1997 | Ebrahim et al. ............ 395/458 |
| 5,655,100 A | 8/1997 | Ebrahim et al. ............ 395/471 |
| 5,657,472 A | 8/1997 | Van Loo et al. ............ 395/485 |
| 5,678,026 A | 10/1997 | Vartti et al. .................. 395/479 |
| 5,680,571 A | 10/1997 | Bauman ...................... 395/449 |
| 5,680,576 A | 10/1997 | Laudon ....................... 395/472 |
| 5,682,322 A | 10/1997 | Boyle et al. ................. 364/491 |
| 5,682,512 A | 10/1997 | Tetrick ........................ 395/412 |
| 5,684,977 A | 11/1997 | Van Loo et al. ............ 395/470 |

(List continued on next page.)

OTHER PUBLICATIONS

Related U.S. patent application Ser. No. 09/739,667, filed Dec. 20, 2000.
Related U.S. patent application Ser. No. 09/641,708, filed Aug. 21, 2000.

Primary Examiner—Kevin Verbrugge
(74) Attorney, Agent, or Firm—Kenyon & Kenyon (57) ABSTRACT

A method of managing requests in a multi-node system. A first request associated with a location in a memory address space is sent to a first node. A second request associated with the same location in the same location in the memory address space is received before a response is received from the first node to the first request. If the received second request had been received from the first node, a retry message is sent to the first node requesting resending of the second request.

24 Claims, 5 Drawing Sheets

U.S. PATENT DOCUMENTS

| | | | |
|---|---|---|---|
| 5,699,500 A | 12/1997 | Dasgupta | 395/180 |
| 5,701,313 A | 12/1997 | Purdham | 371/40.2 |
| 5,701,413 A | 12/1997 | Zulian et al. | 395/200.02 |
| 5,708,836 A | 1/1998 | Wilkinson et al. | 395/800 |
| 5,710,935 A | 1/1998 | Barker et al. | 395/800 |
| 5,713,037 A | 1/1998 | Wilkinson et al. | 395/800 |
| 5,717,942 A | 2/1998 | Haupt et al. | 395/800 |
| 5,717,943 A | 2/1998 | Barker et al. | 395/800 |
| 5,717,944 A | 2/1998 | Wilkinson et al. | 395/800 |
| 5,734,921 A | 3/1998 | Dapp et al. | 395/800.1 |
| 5,734,922 A | 3/1998 | Hagersten et al. | 395/800.37 |
| 5,742,510 A | 4/1998 | Rostoker et al. | 364/468.03 |
| 5,745,363 A | 4/1998 | Rostoker et al. | 364/468.28 |
| 5,749,095 A | 5/1998 | Hagersten | 711/141 |
| 5,752,067 A | 5/1998 | Wilkinson et al. | 395/800.16 |
| 5,754,789 A | 5/1998 | Nowatzyk et al. | 395/200.63 |
| 5,754,871 A | 5/1998 | Wilkinson et al. | 395/800 |
| 5,754,877 A | 5/1998 | Hagersten et al. | 395/800.29 |
| 5,761,523 A | 6/1998 | Wilkinson et al. | 395/800.2 |
| 5,765,011 A | 6/1998 | Wilkinson et al. | 395/800.2 |
| 5,781,439 A | 7/1998 | Rostoker et al. | 364/468.28 |
| 5,784,697 A | 7/1998 | Funk et al. | 711/170 |
| 5,787,094 A | 7/1998 | Cecchi et al. | 371/53 |
| 5,793,644 A | 8/1998 | Koford et al. | 364/491 |
| 5,794,059 A | 8/1998 | Barker et al. | 395/800.1 |
| 5,796,605 A | 8/1998 | Hagersten | 365/134 |
| 5,802,578 A | 9/1998 | Lovett | 711/147 |
| 5,805,839 A | 9/1998 | Singhal | 395/292 |
| 5,815,403 A | 9/1998 | Jones et al. | 364/489 |
| 5,842,031 A | 11/1998 | Barker et al. | 395/800 |
| 5,848,254 A | 12/1998 | Hagersten | 395/383 |
| 5,857,113 A | 1/1999 | Muegge et al. | 395/830 |
| 5,860,159 A | 1/1999 | Hagersten | 711/151 |
| 5,862,316 A | 1/1999 | Hagersten et al. | 395/182.13 |
| 5,864,738 A | 1/1999 | Kessler et al. | 395/200.69 |
| 5,867,649 A | 2/1999 | Larson | 395/200.31 |
| 5,870,313 A | 2/1999 | Boyle et al. | 364/491 |
| 5,870,619 A | 2/1999 | Wilkinson et al. | 395/800.2 |
| 5,875,117 A | 2/1999 | Jones et al. | 364/491 |
| 5,875,201 A | 2/1999 | Bauman et al. | 371/49.1 |
| 5,875,462 A | 2/1999 | Bauman et al. | 711/119 |
| 5,875,472 A | 2/1999 | Bauman et al. | 711/150 |
| 5,878,241 A | 3/1999 | Wilkinson et al. | 395/379 |
| 5,878,268 A | 3/1999 | Hagersten | 395/800.28 |
| 5,881,303 A | 3/1999 | Hagersten et al. | 395/800.3 |
| 5,887,138 A | 3/1999 | Hagersten et al. | 395/200.45 |
| 5,887,146 A | 3/1999 | Baxter et al. | 395/284 |
| 5,892,970 A | 4/1999 | Hagerstein | 395/825 |
| 5,897,657 A | 4/1999 | Hagersten et al. | 711/145 |
| 5,900,020 A | 5/1999 | Safranek et al. | 711/167 |
| 5,903,461 A | 5/1999 | Rostoker et al. | 364/468.28 |
| 5,905,881 A | 5/1999 | Tran et al. | 395/395 |
| 5,905,998 A | 5/1999 | Ebrahim et al. | 711/144 |
| 5,911,052 A | 6/1999 | Singhal et al. | 395/293 |
| 5,914,887 A | 6/1999 | Scepanovic et al. | 364/491 |
| 5,922,063 A | 7/1999 | Olnowich et al. | 710/132 |
| 5,925,097 A | 7/1999 | Gopinath et al. | 709/200 |
| 5,931,938 A | 8/1999 | Drogichen et al. | 712/15 |
| 5,938,765 A | 8/1999 | Dove et al. | 713/1 |
| 5,941,967 A | 8/1999 | Zulian | 710/107 |
| 5,943,150 A | 8/1999 | Deri et al. | 359/133 |
| 5,946,710 A | 8/1999 | Bauman et al. | 711/129 |
| 5,950,226 A | 9/1999 | Hagersten et al. | 711/124 |
| 5,958,019 A | 9/1999 | Hagersten et al. | 709/400 |
| 5,960,455 A | 9/1999 | Bauman | 711/120 |
| 5,961,623 A | 10/1999 | James et al. | 710/113 |
| 5,963,745 A | 10/1999 | Collins et al. | 395/800.13 |
| 5,963,746 A | 10/1999 | Barker et al. | 395/800.2 |
| 5,963,975 A | 10/1999 | Boyle et al. | 711/147 |
| 5,964,886 A | 10/1999 | Slaughter et al. | 714/4 |
| 5,966,528 A | 10/1999 | Wilkinson et al. | 395/563 |
| 5,971,923 A | 10/1999 | Finger | 600/437 |
| 5,978,578 A | 11/1999 | Azarya et al. | 395/701 |
| 5,978,874 A | 11/1999 | Singhal et al. | 710/107 |
| 5,983,326 A | 11/1999 | Hagersten et al. | 711/147 |
| 5,999,734 A | 12/1999 | Willis et al. | 395/706 |
| 6,026,461 A | 2/2000 | Baxter et al. | 710/244 |
| 6,038,646 A | 3/2000 | Sproull | 711/158 |
| 6,038,651 A | 3/2000 | VanHuben et al. | 712/21 |
| 6,041,376 A | 3/2000 | Gilbert et al. | 710/108 |
| 6,049,845 A | 4/2000 | Bauman et al. | 710/113 |
| 6,049,853 A | 4/2000 | Kingsbury et al. | 711/147 |
| 6,052,760 A | 4/2000 | Bauman et al. | 711/119 |
| 6,055,617 A | 4/2000 | Kingsbury | 711/203 |
| 6,065,037 A | 5/2000 | Hitz et al. | 709/200 |
| 6,065,077 A | 5/2000 | Fu | 710/100 |
| 6,081,844 A | 6/2000 | Nowatzyk et al. | 709/233 |
| 6,085,295 A | 7/2000 | Ekanadham et al. | 711/145 |
| 6,092,136 A | 7/2000 | Luedtke | 710/107 |
| 6,092,156 A | 7/2000 | Schibinger et al. | 711/145 |
| 6,094,715 A | 7/2000 | Wilkinson et al. | 712/20 |
| 6,108,739 A | 8/2000 | James et al. | 710/113 |
| 6,119,215 A | 9/2000 | Key et al. | 712/19 |
| 6,148,361 A | 11/2000 | Carpenter et al. | 710/260 |
| 6,141,733 A | 12/2000 | Arimilli et al. | 711/141 |
| 6,155,725 A | 12/2000 | Scepanovic et al. | 395/500.1 |
| 6,161,191 A | 12/2000 | Slaughter et al. | 714/4 |
| 6,167,489 A | 12/2000 | Bauman et al. | 711/145 |
| 6,171,244 B1 | 1/2001 | Finger et al. | 600/437 |
| 6,173,386 B1 | 1/2001 | Key et al. | 712/10 |
| 6,173,413 B1 | 1/2001 | Slaughter et al. | 714/6 |
| 6,182,112 B1 | 1/2001 | Malek et al. | 709/201 |
| 6,189,078 B1 | 2/2001 | Bauman et al. | 711/156 |
| 6,189,111 B1 | 2/2001 | Alexander et al. | 714/8 |
| 6,192,452 B1 * | 2/2001 | Bannister et al. | 711/118 |
| 6,199,135 B1 | 3/2001 | Maahs et al. | 710/129 |
| 6,199,144 B1 | 3/2001 | Arora et al. | 711/145 |
| 6,205,528 B1 | 3/2001 | Kingsbury et al. | 711/170 |
| 6,209,064 B1 | 3/2001 | Weber | 711/141 |
| 6,212,610 B1 | 4/2001 | Weber et al. | 711/164 |
| 6,226,714 B1 | 5/2001 | Safranek et al. | 711/119 |
| 6,226,718 B1 * | 5/2001 | Carpenter et al. | 711/121 |
| 6,269,428 B1 * | 7/2001 | Carpenter et al. | 710/240 |
| 6,279,085 B1 * | 8/2001 | Carpenter et al. | 710/200 |

* cited by examiner

METHOD AND APPARATUS FOR PREVENTING STARVATION IN A MULTI-NODE ARCHITECTURE

FIELD OF THE INVENTION

Embodiments of the present invention relate to a computer system having a multi-node computer architecture. In particular, the present invention relates to a method and apparatus for managing memory related requests in a multi-node architecture such that there is no starvation of requests from a subset of nodes and every request from a node gets a chance to eventually complete.

BACKGROUND

Computer systems may contain multiple processors that may work together to perform a task. For example, a computer system may contain four processors that may share system resources (e.g., input devices or memory devices) and may perform parallel processing. The processors may send messages to each other, may send messages to system resources, and may send and receive messages from the system resources. For example, such messages may include requests for information that is stored at a location in a memory device or a request to store information in a location of a memory device.

In many computer systems, the set of data currently being used by a microprocessor may be copied from a system memory device such as a dynamic random access memory (DRAM) into a relatively smaller but faster cache memory device such as a static random access memory (SRAM). The cache memory device is usually private to each processor such that only one processor can read or write to it. In such systems, a cache is said to be "coherent" if the information resident in the cache reflects a consistent view of the information in all the private cache memory devices and the DRAM memory. Cache "snooping" is a technique used to detect the state of a memory location in private cache memory devices on a memory access that might cause a cache coherency problem. In a multi-processor system, the messages sent between processors may include cache snooping messages.

A processor may be said to encounter a "livelock" or "starvation" situation when a coherency event generated by a processor is unable to complete for an indefinite amount of time even after repeated attempts, because another event from the same processor or another processor prevents it from making forward progress. If the sending of requests from processors in a multi-processor system and servicing of the requests at the responding agent is not managed properly, then some of the requests may be starved by the responding agent and a livelock situation may occur. For example, a first processor may be accessing a memory location, and at the same time the second processor may be also accessing the same memory location. If the memory agent can satisfy only one request to a memory location at a time and must ask all other requests to the same location to be reissued, then it is possible that the request from the first processor never completes because the same memory location is being accessed again and again by the second processor. In this case, requests from the second processor cause starvation of the request from the first processor, therefore causing a livelock at the first processor.

DETAILED DESCRIPTION

Figure 1:
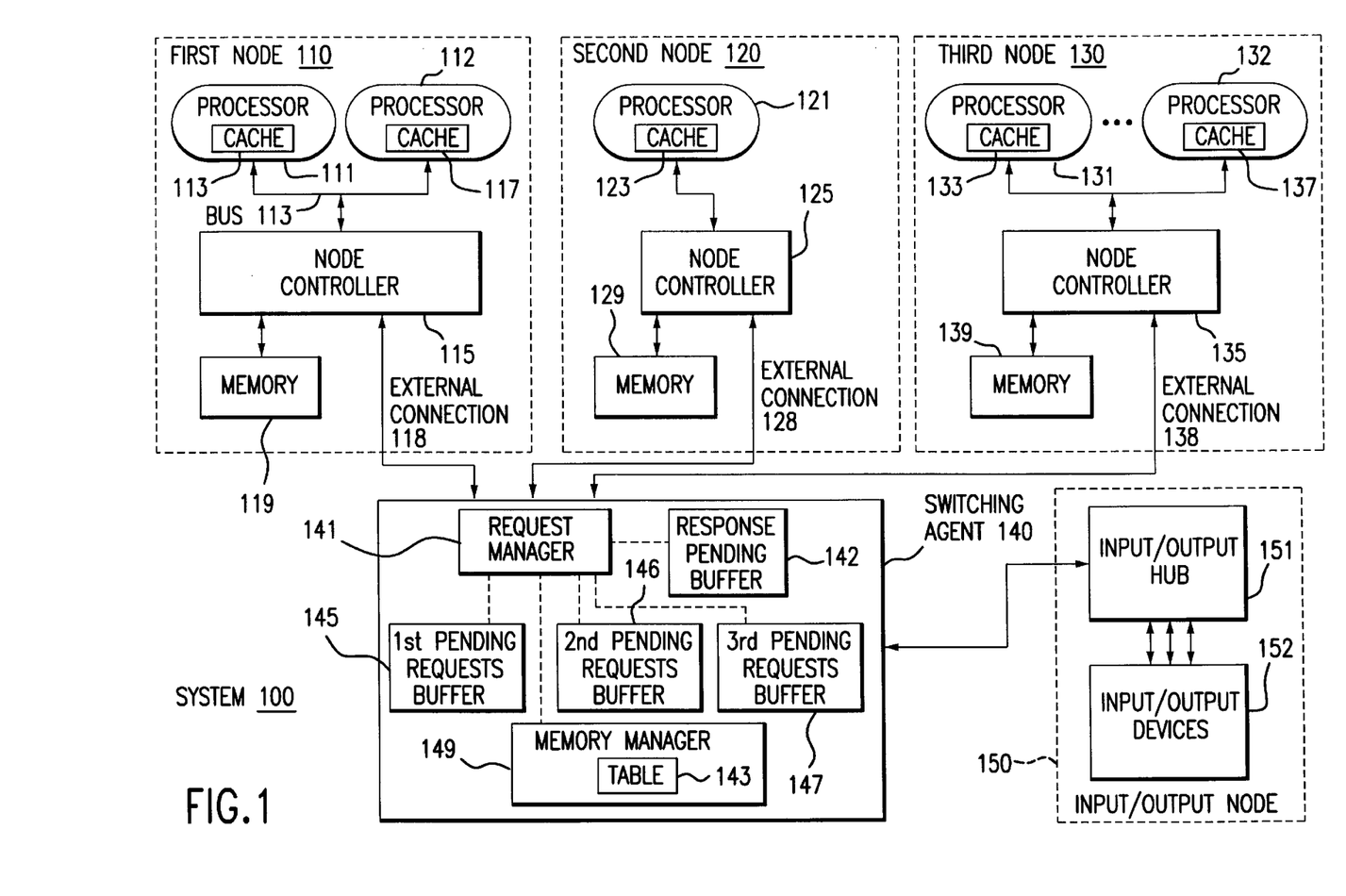
FIG. 1 is a partial block diagram of a system having a switching agent that manages memory requests according to an embodiment of the present invention.

Embodiments of the present invention relate to methods and apparatus of preventing livelock and starvation situations in multi-node system in which requests to access memory are sent through a switching agent. FIG. 1 is a partial block diagram of a system having a switching agent that manages memory requests according to an embodiment of the present invention. FIG. 1 shows a system 100 which is a computer system that includes processors, memory devices, and input/output devices. Components in system 100 are arranged into architectural units that are referred to herein as "nodes." A system that has multiple nodes may be referred to as a "multi-node" system.

Each node may contain one or more processors, memories, or input/output devices. The components within a node may be connected to other components in that node through one or more busses or signals. In addition, each node in system 100 has an external connection that may be used by the components within that node to communicate with components in other nodes. In one embodiment, any communication from a component within a first node to another node must be routed though the external connection for the first node. In system 100, the external connection for each node is connected to a switching agent 140. A multi-node system for which each node communicates to other nodes through a dedicated connection (such as switching agent 140) may be said to have a point-to-point architecture.

The nodes in system 100 may send messages that are directed to a processor, memory or resource in another node. For example, one node may send a request to read from a memory location that is stored in another node. Similarly, a node may send a request to snoop the caches in the other nodes. In one embodiment, all requests in system 100 from one node to another node may be sent to switching agent 140, and switching agent 140 may send requests to other nodes that are based on the first request. For example, switching agent 140 may receive a request from a first node to snoop for a particular memory location, and switching agent 140 may send snoop requests to the other nodes in system 100 as is appropriate to carry out the received snoop request.

After a node in system 100 has acted on a request that it received, it may send a response. For example, if a node receives a read request from switching agent 140, it may read the data from a memory and respond by sending the data requested to switching agent 140. It is possible that switching agent 140 may send a request associated with a particular location in a memory (i.e., a memory location) to a node and, before receiving a response from that node to the request sent, the switching agent receives a second request from another node to the same or different location in the memory. According to a coherency protocol, the switching agent 140 may be not be able to accept the request from the second node if it does not have the necessary resources, or the switching agent may be required to not accept the second request if it is to the same memory location as the first request. In either of these cases, the switching agent 140 may give a retry response to the second request and expect the requesting node to reissue the request at a later instance. Since the switching agent 140 is not required to accept every request and it is allowed to give a retry response, it is possible that a request from a node always gets a retry response from the switching agent when it is reissued by the requesting node and reaches the switching agent. This may be indicated as a starvation or livelock condition, which is undesirable and must be avoided for a system to work properly. Embodiments of the present invention relate to preventing these livelock or starvation conditions.

A request is associated with a memory location, for example, if it is a request to access that location in the memory. Thus, a request to read from a location in a memory or to write to a location in a memory are associated with that location in the memory. Other types of requests also may be associated with a memory location, such as for example a snoop request.

The details shown in FIG. 1 will now be discussed. As shown in FIG. 1, system 100 includes a first node 110, a second node 120, a third node 130, and an input/output node 150. Each of these nodes is coupled to switching agent 140. The term "coupled" encompasses a direct connection, an indirect connection, an indirect communication, etc. First node 110 is coupled to switching agent 140 through external connection 118, second node 120 is coupled to switching agent 140 through external connection 128, and third node 130 is coupled to switching agent 140 through external connection 138. External connections 118, 128, and 138 may be one or more lines capable of communicating information to and from the node.

First node 110 includes processor 111, processor 112, and node controller 115, which are coupled to each other by bus 113. Processor 111 and processor 112 may be any microprocessors that are capable of processing instructions, such as for example a processor in the INTEL PENTIUM family of processors. Bus 113 may be a shared bus. First node 110 also contains a memory 119 which is coupled to node controller 115. Memory 119 may be a Random Access Memory (RAM). Processor 111 may contain a cache 113, and processor 112 may contain a cache 117. Cache 113 and cache 117 may be Level 2 (L2) cache memories that are comprised of static random access memory.

Similarly, second node 120 contains a processor 121 and node controller 125 which are coupled to each other. Second node 120 also contains a memory 129 that is coupled to node controller 125. Third node 130 contains a processor 131, processor 132, and node controller 135 that are coupled to each other. Third node 130 also contains a memory 139 that is coupled to node controller 135. Processor 121 may contain a cache 123, processor 131 may contain a cache 133, and processor 132 may contain a cache 137. Processors 121, 131, and 132 may be similar to processors 111 and 112. In an embodiment, two or more of processors 111, 112, 121, 131, and 132 are capable of processing a program in parallel. Node controllers 125 and 135 may be similar to node controller 115, and memory 129 and 139 may be similar to memory 119. As shown in FIG. 1, third node 130 may contain processors in addition to 131 and 132.

In one embodiment, switching agent 140 may be a routing switch for routing messages within system 100. As shown in FIG. 1, switching agent 140 contains a request manager 141, response pending buffer 142, first pending requests buffer 145, second pending requests buffer 146, third pending requests buffer 147, and memory manager 149. Request manager 141 may include hardware, such as circuits that are wired to perform operations, or program instructions, such as firmware that performs operations. Request manager 141 may be adapted to manage requests that are received by switching agent 140 from nodes in system 100, or are to be sent to nodes by switching agent 140, in order to prevent livelock and starvation according to embodiments of the present invention as discussed below.

Response pending buffer 142, first pending requests buffer 145, second pending requests buffer 146, and third pending requests buffer 147 may each be regions of a memory in switching agent 140 used as a temporary repository of data. In particular, response pending buffer 142 may be used to store information about requests that have been sent out but for which a response has not yet been received (i.e., a response is pending). Pending requests buffers 145, 146, and 147 may be used to store requests that have been received by switching agent 140 but have not yet been processed by switching agent 140. In the embodiment shown in FIG. 1, first pending requests buffer 145 contains requests sent by first node 110, second pending requests buffer 146 contains requests sent by second node 120, and third pending requests buffer 147 contains requests sent by third node 130. In other embodiments, switching agent 140 may have more or less pending request buffers. For example, switching agent 140 may have a single pending request buffer for all the nodes in the system. Buffers 142, 145, 146, and 147 may be stored in a single memory device or in some combination of multiple memory devices in switching agent 140.

Switching agent 140 may also contain a memory manager 149 which may include hardware, such as circuits that are wired to perform operations, or program instructions, such as firmware that performs operations. Memory manager 149 may be adapted to process requests that are received by switching agent 140. Processing of such requests may include identifying nodes that contain a copy in their private cache memory of information stored at a location in a memory address space that is associated with the request, sending requests that are based on the request being processed to each of said identified nodes, and storing an entry in the response pending buffer for each request sent. Memory manager 149 may include a table 143 in a memory that is used to determine to which nodes a request should be sent.

As shown in FIG. 1, input/output node 150 contains an input/output hub 151 that is coupled to one or more input/output devices 152. Input/output devices 152 may be, for example, any combination of one or more of a disk, network, graphics display, printer, keyboard, mouse, or any other input/output device. Input/output hub 151 may by an integrated circuit that contains bus interface logic for interfacing with a bus that complies to the Peripheral Component Interconnect standard or any other Input/Output interconnect standard. Input/output hub 150 may be similar to, for example, the INTEL 82801AA I/O Controller Hub.

In an embodiment, node controller 115, switching agent 140, and input/output hub 151 may be a chipset that provides the core functionality of a motherboard, such as a modified version of a chipset in the INTEL 840 family of chipsets.

In a further embodiment, inter-node communication in system 100 is asynchronous (i.e., there is no fixed timing between events). In a still further embodiment, inter-node communication is sent in the form of packets which may contain a header and data sections. An example of a message size may be 144 bits. In an embodiment, the messages sent may include requests and responses. In a further embodiment, the types of requests that the nodes may send and receive may include a memory read request, memory write request, cache snoop request, cache flush request, memory update request, cache line replacement request, input/output port read request, and input/output port write request. Requests may contain fields such as a packet type, destination ID, request type, source ID, transaction address, request length, stream ID, and ordering semantics.

In an embodiment of the present invention, the processors in nodes 110, 120 and 130 may be shared memory multi-processors, and each of the memories 119, 129, and 139 may be part of the same shared physical address space. In a further embodiment, the processors in nodes 110, 120, and 130 communicate with each other through shared memory reads and writes (i.e., by writing to and reading from memory 119, 129 and 139). In a further embodiment, the processors in nodes 110, 120 and 130 each have one or more caches (e.g., Level 1 and Level 2 caches), and these caches are kept coherent using the switching agent 140. For example, when processor 111 accesses a location in memory 119, it may send a snoop request for that memory location to switching agent 140, which may determine if any of the processors in second node 120 and third node 130 have cached that memory location. A snoop request may be generated when a processor needs other processors in the system to look in their own caches to see if a particular line is present in their cache.

Figure 2:
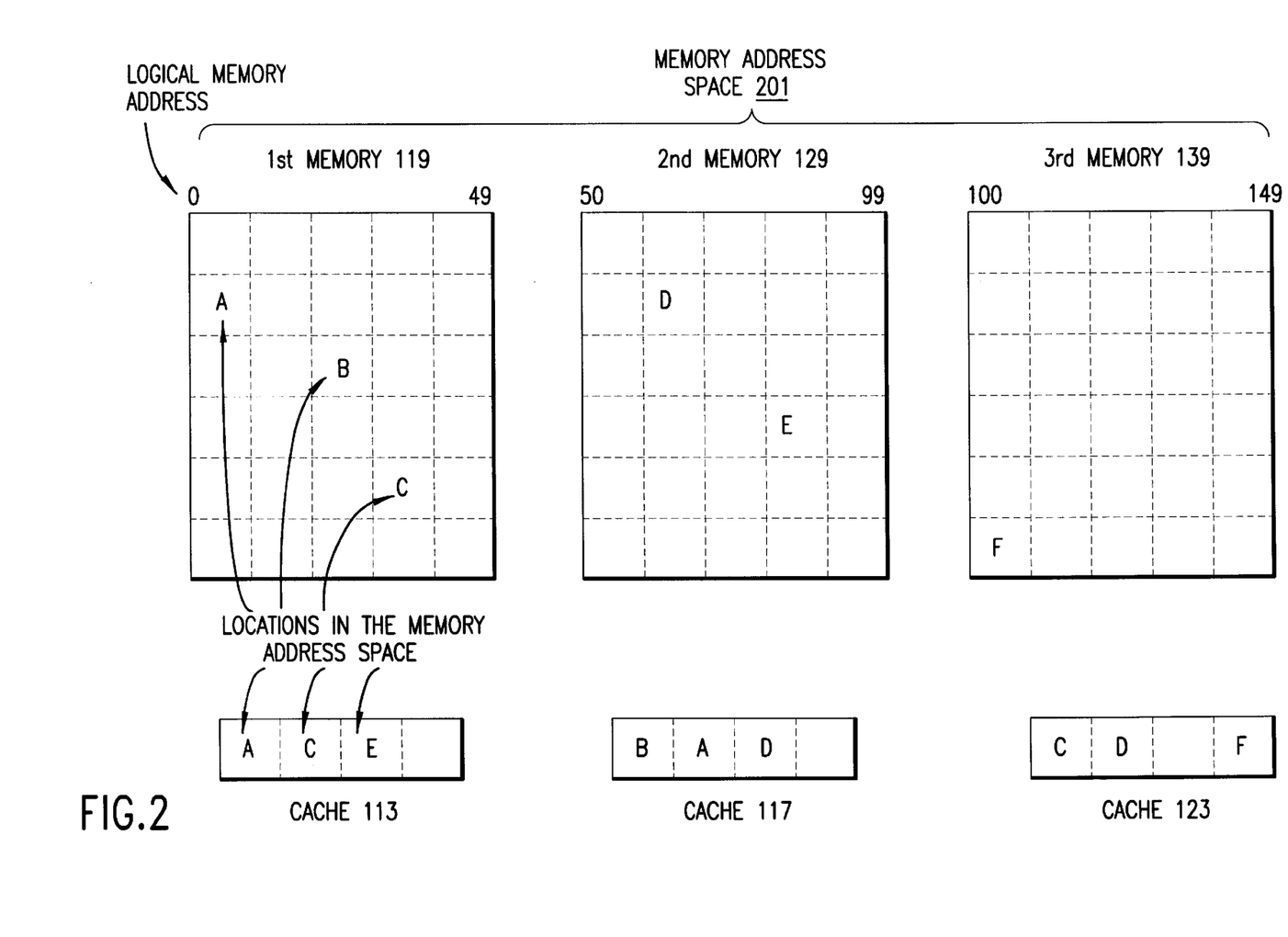
FIG. 2 is a partial block diagram showing a memory address space for a multi-node system according to an embodiment of the present invention.

FIG. 2 is a partial block diagram showing a memory address space 201 and caches for a multi-node system according to an embodiment of the present invention. Memory address space 201 includes first memory 119, second memory 129, and third memory 139, which are shown respectively in first node 110, second node 120, and third node 130 in FIG. 1. For the purpose of illustration, first memory 119 is shown as containing the addresses 0 to 49, second memory 129 is shown as containing the addresses 50 to 99, and third memory 139 is shown as containing the addresses 100 to 149. Thus, in this embodiment, address space 201 contains the locations in addresses 0 to 149. Of course, in other embodiments address space 201 may contain other addresses, and address space 201 may be spread across more or less memories than as shown in FIG. 2. Address space 201 may be referred to as a "shared" address space because any node in the multi-node system may address any location in address space 201. Thus, second node 120 may send a request to read from location 0 in the address space, location 0 being contained in memory 119 in first node 110.

FIG. 2 also shows caches 113, 117, and 123, which are contained in first node 110 and second node 120 of FIG. 1. The multi-node system may contain more or less caches than is shown in FIG. 2 (such as caches 133 and 137 of FIG. 1). In an embodiment, each addressable location of memory in address space 201 may be the size of a cache line in caches 113, 117, and 123. In FIG. 2, certain locations in the memory address space 201 are designated as A, B, C, D, E and F for the purposes of reference. Each of these locations stores some information (data or instructions). The information in any particular location in the memory address space 201 may be cached in one or more of the caches in the system. Thus, a copy of the information in the location designated A in first memory 119 is cached in caches 113, 117, and 123; a copy of the information in the location designated B in first memory 119 is cached in cache 117; a copy of the information in the location designated C in first memory 119 is cached in caches 113 and 123; a copy of the information in the location designated D in second memory 129 is cached in cache 117 and cache 123; a copy of the information in the location designated E in second memory 129 is cached in cache 113; and a copy of the information in the location designated F in third memory 139 is cached in cache 123.

Switching agent 140 may process requests as follows. If switching agent 140 receives from third node 130 a request to snoop the memory location designated as A (in FIG. 2), memory manager 149 may determine from table 143 that memory location A is cached in both cache 113 (in first node 110) and cache 117 (in second node 120). Memory manager 149 may then cause snoop requests that are associated with location A to be sent to first node 110 and second node 120.

Figure 3:
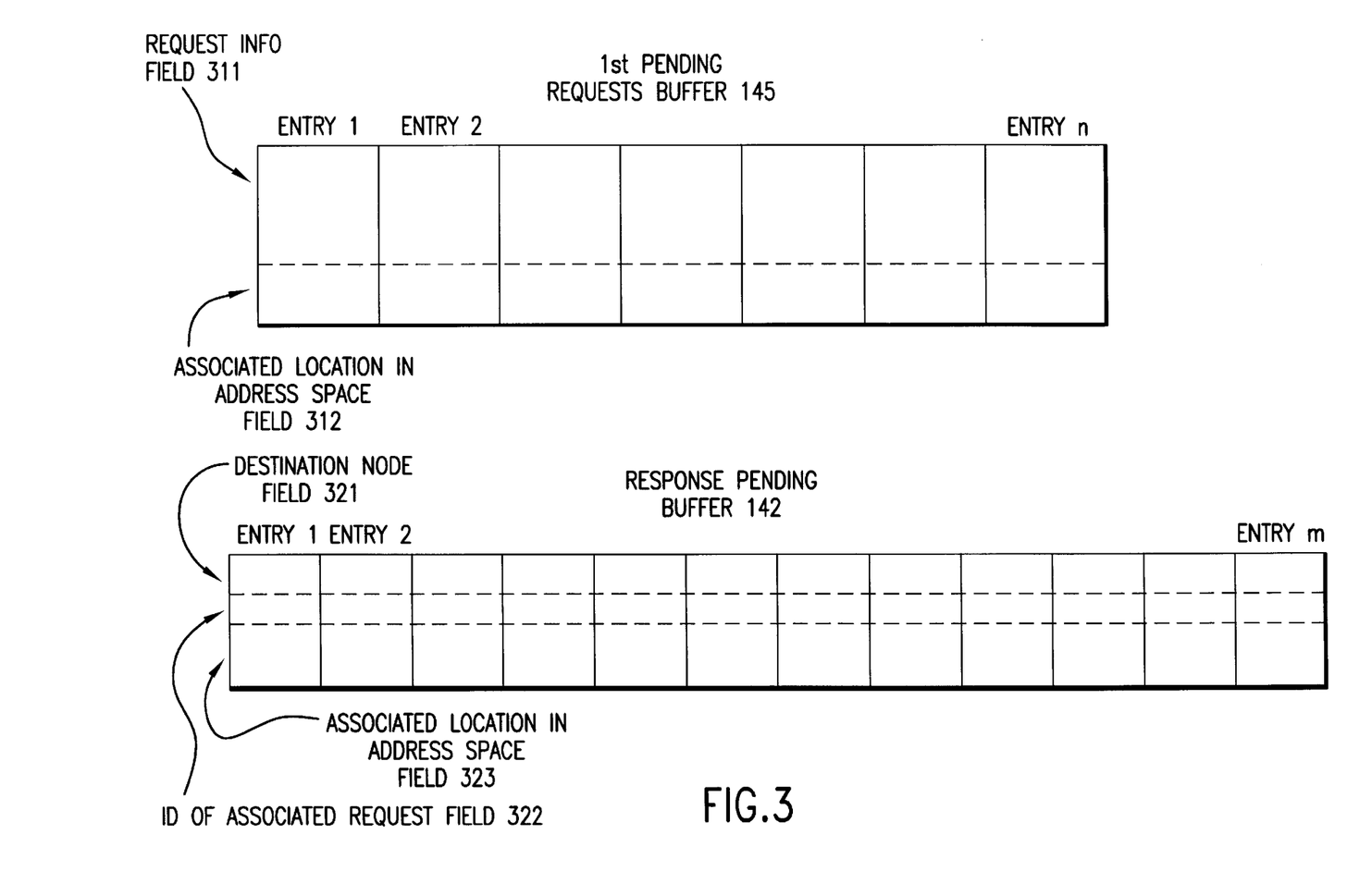
FIG. 3 is a partial block diagram showing a request pending buffer and a response pending buffer that may be used in a switching agent in a multi-node system according to an embodiment of the present invention.

FIG. 3 is a partial block diagram showing a request pending buffer and a response pending buffer that may be used in a switching agent in a multi-node system according to an embodiment of the present invention. In particular, FIG. 3 shows more details of first pending requests buffer 145 and response pending buffer 142. Second pending requests buffer 146 and third pending requests buffer 147 may contain the same structure as first pending requests buffer 145. As shown in FIG. 3, first pending requests buffer 145 may contain entries 1 to n and response pending buffer 142 may contain entries 1 to m. Each entry in first pending requests buffer 145 may contain a request information field 311, which contains information about the request stored in that entry, and an associated location in address space field 312, which contains the address space associated with the request. Each entry in response pending buffer 142 may contain a destination node field 321, an ID of associated request field 322, and an associated address field 323. In another embodiment, each entry in response pending buffer 142 is associated with one or more requests that were sent by the switching agent and for which a response is pending. Each such entry records information for each request sent. First pending request buffer 145 and response pending buffer 142 may be used as discussed below.

Figure 4:
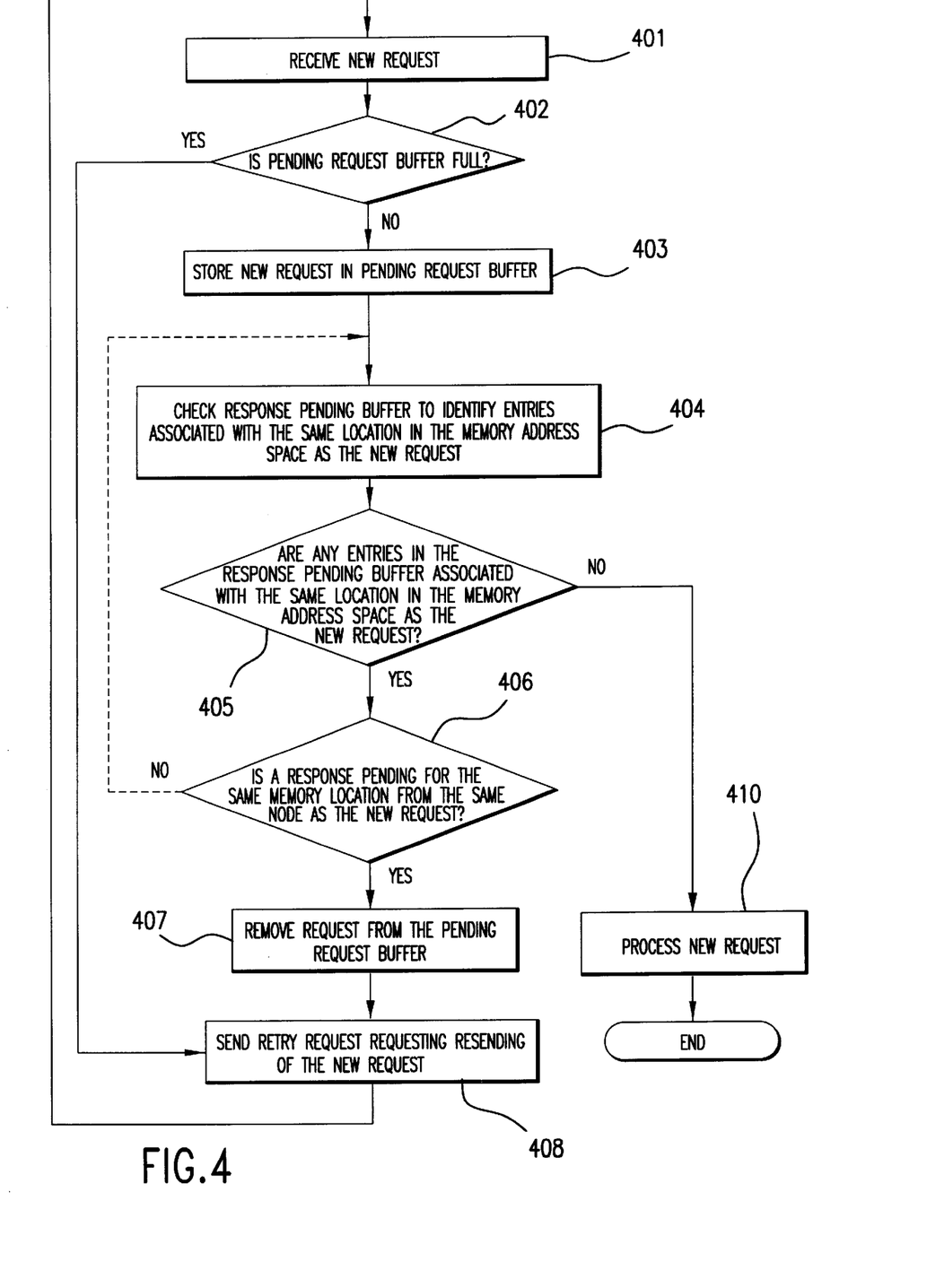
FIG. 4 is a flow diagram of a method of managing requests in a multi-node system according to an embodiment of the present invention.

FIG. 4 is a flow diagram of a method of managing requests in a multi-node system according to an embodiment of the present invention. This method may be performed by a device, such as for example switching agent 140 of FIG. 1. As shown in FIG. 4, a new request is received by the device (401). The new request may be received from a first node, such as first node 110, and the new request may be associated with a location in a memory address space, such as memory address space 201. For example, first node 110 may have sent a request to read from a location in the memory address space or a request to snoop for a location in the memory address space. Prior to receiving the new request, switching agent 140 may have sent one or more requests to nodes in the system. During the process of sending requests for each memory location, switching agent 140 may have created a new entry associated with the memory location in a response pending buffer. The response pending buffer may contain entries that are associated with memory locations for which requests have been sent by the device and for which the device has not received all the responses (i.e., a response is pending). That is, an entry may be created in the response pending buffer when one or more requests are sent and may be removed from the response pending buffer when all responses to the requests are received.

After receiving a new request, the switching device 140 may check if the corresponding Pending Request Buffer for that node is full (402). If the Pending Request Buffer is full, then the new request is not stored in the Pending Request Buffer and a retry response is sent to the requesting node asking it to resend the request later (408). This type of request retry is classified as a "resource induced retry", because a Pending Request Buffer resource was not available to process the request. The switching agent 140 may receive the resent version of the request at a later time and it will be treated as a new request by the switching agent.

If a Pending Request Buffer entry is available to process the new request, then the new request is stored in the Pending Request Buffer (403). Once a Pending Request Buffer entry is allocated to the new request, the switching device 140 may check the response pending buffer to identify entries associated with the same location in the memory address space as the new request (404–405). If an entry in the response pending buffer is identified as being associated with the same location as the new request, then the switching agent determines (1) if an identified entry is associated with a request that was sent to the same node as the node from which the new request was received and (2) if a response associated with the request has not been received (406). If the identified entry has an outstanding request to the node from which the new request was received, then the request is removed from the Pending Buffer and a retry response is sent to that node requesting resending of the new request (407–408). For example, if (1) the new request was received from the first node, (2) a second request associated with the same memory location as the new request had been sent by the switching agent 140 to the first node, and (3) a response to the second request has not been received by the switching agent 140, then the switching agent 140 removes the request from the pending response buffer (407) and sends a retry response to the first node requesting that the first node resend the new request (408). This type of request retry is classified as a "conflict induced retry", where a conflicting entry to the same memory location in the Response Pending Buffer causes the request to be rejected from the switching agent. At a later time, the switching agent 140 may receive a resent version of the new request, and the received resent version may be processed according to the same method. If none of the entries in the response pending buffer are associated with the same location as the received resent request and if the Response Pending Buffer is not full, then the new request may be entered in the Response Pending Buffer and may be processed as discussed below.

If an entry in the response pending buffer is identified as being associated with the same location as the new request, but the identified entry does not indicate that an outstanding request that was sent to the same node as the node from which the new request was received (406), then the new request is held in the pending request buffer, such as first pending request buffer 145. For example, a new request may be received from a first node, and an entry in the response pending buffer may be associated with the same location as the received new request. If that entry in the response pending buffer indicates to an outstanding request that was sent only to a second node, then the new request may be held in the pending request buffer. At some later time the response pending buffer will be checked to see if there is still an entry associated with the same location (405).

Figure 5:
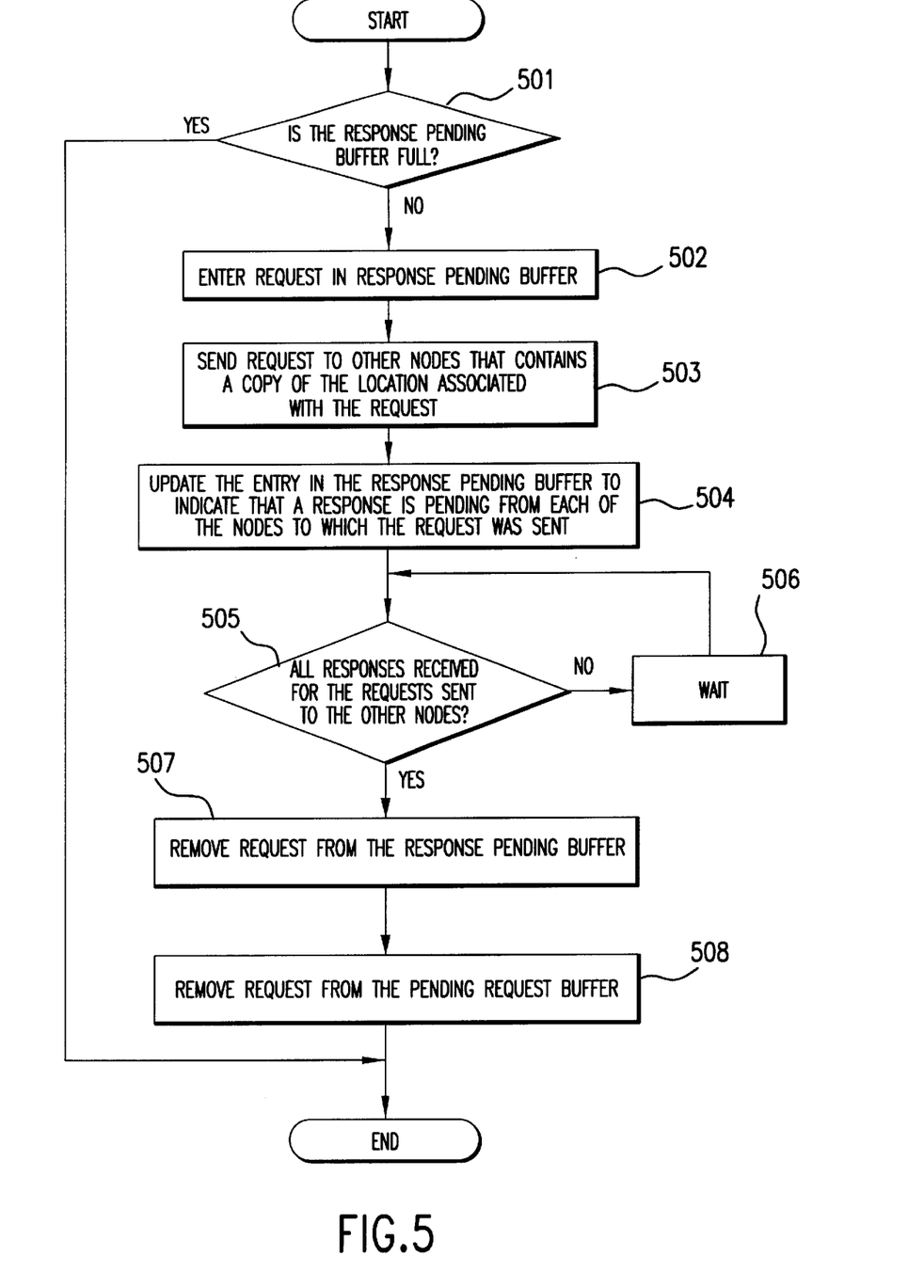
FIG. 5 is a flow diagram of a method of processing a request according to an embodiment of the present invention.

If none of the entries in the response pending buffer are associated with the same location in the memory address space, then the switching device 140 can process the request (410). FIG. 5 is a flow diagram of a method of processing a request according to an embodiment of the present invention. According to the embodiment shown in FIG. 5, the request is entered as an entry in the response pending buffer if an entry is available in the Response Pending Buffer (501–502). If the response pending buffer is full, then the request is held in the Pending Request Buffer and the mechanism continues at a later time.

If the pending request buffer is not full, then the new request may be further processed. Processing the request may include identifying nodes that contain a copy of the location associated with the request in their private cache memory, sending snoop requests that are based on the new request to each of the identified nodes (503), and updating the entry in the response pending buffer to indicate that a response is pending from each of the identified nodes (504). For example, if a new request to read from a location that is contained in memory 129 is received from first node 110, a memory manger in the switching device may check a table and determine that a request to read from that location should be sent to second node 120. A snoop request to that location may be sent to the second node 120, and this request may be based on the received new request. In addition, the entry associated with the request stored in the response pending buffer 142 may be updated to include a destination node (second node 120), an ID of the associated request, and the location in the memory address space that is associated with the request.

When the switching agent 140 receives a response associated with an entry in the response pending buffer 142, it updates the entry to indicate that the response has been received from the associated node. The switching agent may remove the entry from the response pending buffer after responses have been received for all the requests sent to different nodes for that entry (505–507). Once an entry is removed from the response pending buffer, the associated entry in the pending request buffer may also be removed and the entry is available for another new request (508). The switching agent 140 may then select an entry for processing from a pending requests buffer, such as pending requests buffer 145.

In an embodiment, the switching agent selects an entry from the pending requests buffer for processing which entry is not associated with the same location in the memory address space as any of the entries in the response pending buffer. In this embodiment, the selection algorithm is fair among all the pending request buffers such that the requests from each pending buffer gets a fair chance to be processed and enter the response pending buffer. The selection algorithm is also fair among requests within a pending request buffer such that each request in a pending buffer gets a fair chance to check the response pending buffer and enter the response pending buffer. For example, if a request from first pending request buffer 145 cannot enter the response pending buffer because the response pending buffer is processing another request to the same memory location, then another request from the first pending buffer 145 must be given a chance to check and enter the response pending buffer. The request that is stored in the entry selected from the pending requests buffer may then be processed as discussed above. In one embodiment, a pending request buffer is used to store new requests if the memory manager 149 is not ready to process the new request (e.g., if it is busy processing another request). In this embodiment, processing a new request may include determining if the memory manager is ready to process the request and, if not, storing the request in a pending request buffer.

The node controller at each processor and Input/Output node contains an outgoing request buffer that keeps track of all the requests outstanding from the node. A request generated at the node occupies an outgoing request buffer entry until it receives all its associated responses from the switching agent. In the event of the switching agent responding with a retry response to a request, the associated outgoing request buffer entry is kept valid and the request is resent immediately or at a later time. The outgoing request buffer entries also keep track of number of retry response to a request and if the number of retry responses exceed a limit (say 8 retries), then the node controller goes into a recovery mode where the outgoing request buffer does not accept any new request from processor or Input/Output agents until all existing requests are eventually complete.

The present invention may be used to manage the sending of requests in a multi-node system to prevent certain livelock or starvation conditions from occurring. The present invention may be used to prevent starvation or livelock where a switching agent acts as a central arbitration agent for requests from multiple nodes and it may have to reject some requests either due to a resource constraint (resource induced retry) or due to a conflicting access to same memory location (conflict induced retry). Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the nodes in FIG. 1 are shown containing one or two processors, a node may contain any number of processors. In one embodiment, a node contains only one processor, and in another embodiment a node contains four processors. As another example, while the nodes in FIG. 1 are connected through receiving agent 140, in another embodiment two nodes may be directly connected to each other. For example, in a system with that has two nodes, the node controller of a first node may be connected to the node controller of a second node. In another embodiment, the node controller for a node may be part of a processor in that node. For example, a first node in a system may only contain one processor, and the node controller for that node may be part of that processor. In addition, a node (e.g., node 110) may contain one or more processors and an input/output hub. In still another embodiment, the outbound buffer manager, inbound buffer manager, and/or routing manager are implemented as instructions adapted to be executed by a processor, which may include firmware, microcode, object code, source code, ext. As another example, while the embodiment in FIG. 4 stores the new request in the pending request buffer regardless of whether there is a conflict induced retry required and later removes the request if such a retry is required, in another embodiment a new request is only stored in the pending request buffer if a conflict induced retry is not necessary.

We claim:

1. A method of managing requests in a multi-node system, the method comprising:

sending to a first node a first request associated with a location in a memory address space;

receiving a second request associated with the same location in the memory address space before receiving a response from the first node to the first request;

determining whether the received second request had been received from the first node; and sending to the first node a retry message requesting resending of the second request based on a determination that the received second request had been received from the first node.

2. The method of claim 1, wherein said location in the memory address space is the size of a cache line in a cache in the multi-node system.

3. The method of claim 1, wherein the first request is a request to read information stored at said location in the memory address space.

4. The method of claim 1, wherein the method further comprises:

receiving a response from the first node to the first request;

receiving a resent second request from the first node; and sending a third that is based on the received resent second request.

5. The method of claim 4, wherein the third request is a request to snoop for said location in the memory address space.

6. A method of managing requests received by a device in a multi-node system, the method comprising:

receiving at a device a new request from a first node, the new request associated with a location in a memory address space;

checking a response pending buffer containing one or more entries each associated with one or more requests which were sent by the device and for which a response is pending; and sending from said device to the first node a retry message requesting resending of said new request based on a determination that said new request is associated with the same location in the memory address space as an entry in the response pending buffer and that said entry is associated with a request that was sent to the first node.

7. The method of claim 6, wherein the method further comprises:

storing the new request as an entry in a pending requests buffer if the new request is associated with the same location in the memory address space as one or more entries in the response pending buffer and none of said one or more entries is associated with a request that was sent to the first node; and processing the new request if the new request is not associated with the same location in the memory address space as any of the entries in the response pending buffer.

8. The method of claim 7, wherein processing a request comprises:

identifying nodes that contain a copy of the location in the memory address space associated with the request;

sending requests that are based on the new request to each of said identified nodes; and storing an entry in the response pending buffer that records information for each request sent.

9. The method of claim 8, wherein each of said identified nodes includes a cache memory device, wherein said received new request is a request to read from said location in the memory address space, and wherein the requests sent to each of said identified nodes are requests to snoop said cache included in that node for said location in the memory address space.

10. The method of claim 9, wherein each of said identified nodes also includes a plurality of processors.

11. The method of claim 8, wherein the method further comprises:

receiving a response associated with an entry in the response pending buffer;

removing the entry from the response pending buffer that is associated with the response;

selecting an entry from the pending requests buffer, wherein said selected entry does not correspond to the same location in the memory address space as any of the entries in the response pending buffer; and processing the request stored in the entry selected from the pending requests buffer.

12. A switching agent comprising:

a response pending buffer to store a plurality of entries that are each associated with one or more requests that have been sent by the switching agent and for which a response has not been received; and a request manager to send a retry message to a first node when the switching agent receives a new request from the first node and it was determined that the new request is associated with the same location in a memory address space as an entry in the response pending buffer which entry is associated with a request sent to the first node.

13. The switching agent of claim 12, wherein the switching agent further comprises a pending requests buffer to store requests from a first node, and wherein the request manager is adapted to store a received new request in the pending requests buffer when the new request is associated with the same location in the memory address space as one or more entries in the response pending buffer and said one or more entries are not associated with a request sent to the first node.

14. The switching agent of claim 13, wherein the request manager is adapted to select a request from the pending requests buffer, send the request, and store an entry in the response pending buffer associated with the request.

15. The switching agent of claim 14, wherein the switching agent includes a table in a memory to record which nodes have a copy of a location in the memory address space, and wherein the request manager is further adapted to determine from said table which nodes to send a request.

16. The switching agent of claim 15, wherein the entries stored in the pending requests buffer include the memory location with which the request is associated, and wherein the entries stored in the response pending buffer include the node to which the request was sent and the memory location with which the request is associated.

17. A system comprising:

a plurality of nodes each including a plurality of processors;

a switching agent coupled to the first node and the second node of said plurality of nodes, the switching agent including:

a response pending buffer to store an entry associated with a request that had been both sent by the switching agent and for which a response has not been received; and a request manager to send a retry message to a first node when the switching agent receives a new request from the first node and it was determined that the new request is associated with the same location in a memory address space as a response pending buffer entry that is associated with a request sent to the first node.

18. The system of claim 17, wherein the switching agent further comprises a plurality of pending requests buffers each of which is associated with one of said nodes, and wherein the request manager is adapted to store a received new request in one of the pending requests buffers when the new request is associated with the same location in the memory address space as one or more entries in the response pending buffer and said one or more entries are not associated with a request sent to the first node.

19. The system of claim 17, wherein the system further comprises a memory manager to identify nodes that contain a copy of a memory address space section that is associated with a received new request.

20. The system of claim 17, wherein the system further comprises an input/output node that includes a plurality of input/output devices.

21. An article of manufacture comprising a computer-readable medium having stored thereon instructions adapted to be executed by a processor, the instructions which, when executed, cause the processor to:

send to a first node a first request associated with a location in a memory address space;

receive a second request associated with said location in a memory address space before receiving a response from the first node to the first request;

determine whether the received second request had been sent from the first node; and send to the first node a retry message requesting resending of the second request based on a determination that the received second request had been sent from the first node.

22. The article of manufacture of claim 21, wherein the instructions further cause the processor to:

receive a response from the first node to the first request;

receive a resent second request from the first node; and send a third request that is based on the received resent second request.

23. The article of manufacture of claim 21, wherein said location in the memory address space is the size of a cache line in a cache in the multi-node system.

24. The article of manufacture of claim 23, wherein the first request is a request to read information stored at said location in the memory address space.

* * * * *